United States Patent [19]

Jamieson, Jr.

[11] Patent Number: 4,524,964
[45] Date of Patent: Jun. 25, 1985

[54] APPARATUS FOR TRANSFERRING PRINTED MATERIAL ONTO A CHAIN DELIVERY

[75] Inventor: H. William Jamieson, Jr., Encino, Calif.

[73] Assignee: Offset Engineering, Inc., Encino, Calif.

[21] Appl. No.: 426,561

[22] Filed: Sep. 29, 1982

Related U.S. Application Data

[63] Continuation-in-part of Ser. No. 104,500, Dec. 17, 1979, Pat. No. 4,369,963.

[51] Int. Cl.³ .................................. B65H 29/04
[52] U.S. Cl. ...................... 271/204; 271/277; 101/408
[58] Field of Search .............. 271/277, 204, 205, 206; 101/408

[56] References Cited

U.S. PATENT DOCUMENTS

| | | | |
|---|---|---|---|
| 875,247 | 12/1907 | Dierdorff | 198/851 |
| 2,014,975 | 9/1935 | Meckler | 101/408 |
| 2,025,481 | 12/1935 | Stussi | 271/204 |
| 3,842,968 | 10/1974 | Owens | 198/851 |
| 4,203,590 | 5/1980 | Blessing | 271/277 X |

Primary Examiner—Richard A. Schacher
Attorney, Agent, or Firm—Nilsson, Robbins, Dalgarn, Berliner, Carson & Wurst

[57] ABSTRACT

Improved apparatus for facilitating the transfer of a printed sheet, without smudging or wrinkling, to a chain delivery mechanism of the type commonly used in an offset printing system. The apparatus is of the type that includes a bar having a pair of clips at its opposed ends for engaging the continuous chains of the chain delivery. The bar includes at least one paper contacting member that is both rotationally and longitudinally adjustable thereon. The clips, which releasably secure the bar to the continuous chains, are arranged to apply compressive retaining forces to the (inner) vertical side members pre-selected links of the continuous chains so that the mobility of the links of the chains is substantially unaffected by the presence of the clips.

11 Claims, 4 Drawing Figures

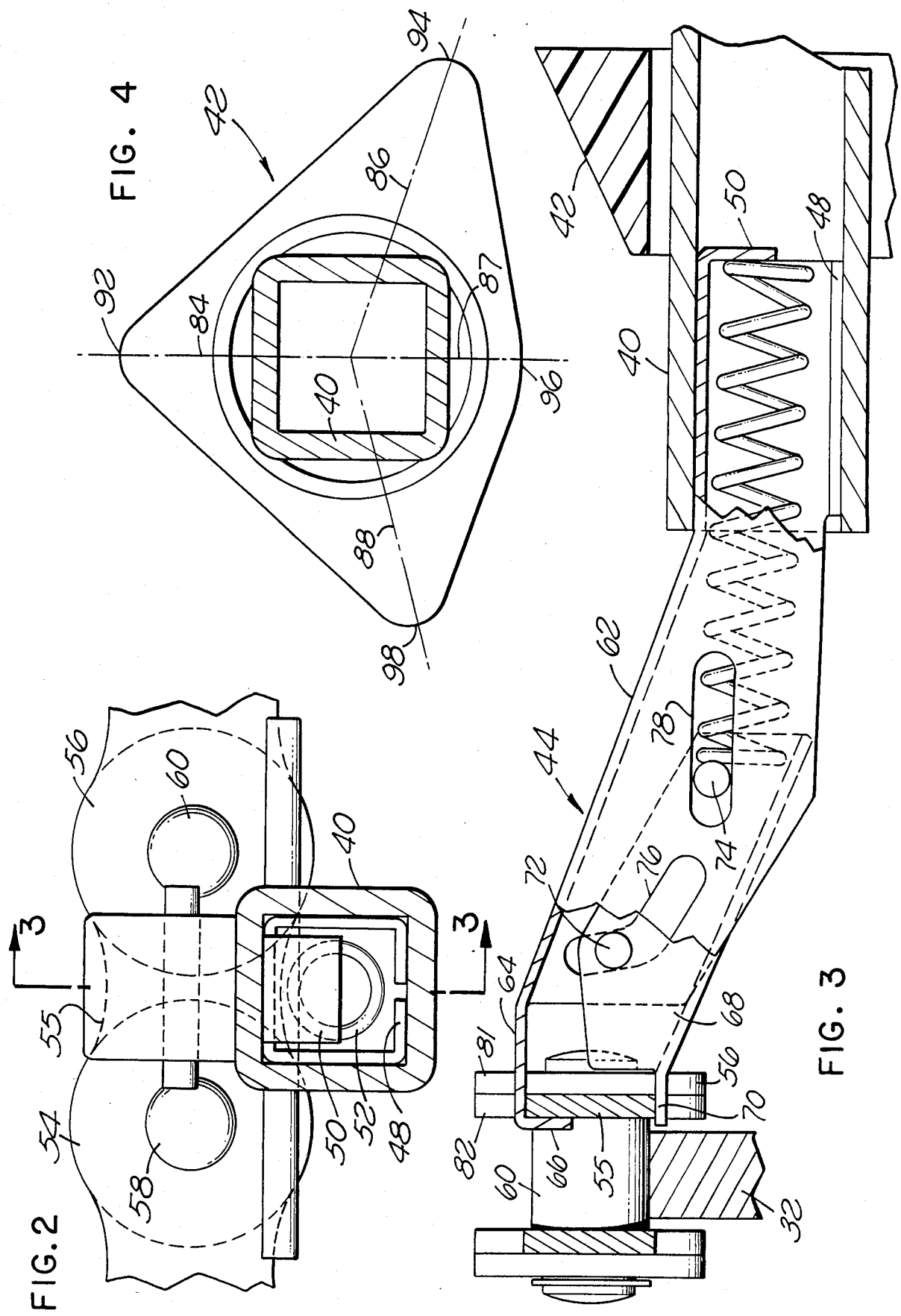

APPARATUS FOR TRANSFERRING PRINTED MATERIAL ONTO A CHAIN DELIVERY

REFERENCE TO RELATED PATENT APPLICATION

The present application is a continuation-in-part of U.S. patent application Ser. No. 104,500 of H. William Jamieson entitled "Clip-On Star Wheel Substitute", filed Dec. 17, 1979, now U.S. Pat. No. 4,369,963.

BACKGROUND OF THE INVENTION

1. Field of the Invention

The present invention is directed generally to the printing arts. More particularly, this invention pertains to improved apparatus for effecting the transfer of printed material from an impression cylinder to a chain delivery mechanism of the type employed in a conventional offset printing system.

2. Description of the Prior Art

In the offset printing art, conventional arrangements feature the use of rotatable, contacting blanket and impression cylinders to effect the transfer of a desired image onto sheets of paper guided therebetween. After travelling through the point of contact between the surfaces of these cylinders, the imprinted material is then grasped at an edge by means of "grippers", well-known in the offset printing art, and advanced by means of a chain delivery mechanism, also well-known in the art, to thereby pull and, when appropriate, release the printed material. The chain delivery includes a pair of opposed continuous chains that circulate between pairs of sprockets, one of such pairs of sprockets being engaged to and driven by a motor. The various elements of the system are appropriately synchronized so that the printed matter is grabbed by the gripper, removed at an appropriate rate and thereafter released. At the same time, a new sheet is received by the blanket and impression cylinders without undue delay. The gripper continually repeats a cycle of grabbing and releasing sheets to cause the printed material to be accumulated in a pile.

A recognized problem with systems such as the star wheel system is that while wrinkling is minimized smudging or marking occurs as the printed material is transferred from the rotating cylinders to the grippers. Various attempts have been made to prevent such smudging of the freshly-printed material. Representative attempts include the air cushion drum. The air cushion drum, while eliminating the smudging problem of the star wheel, requires large amounts of energy with attendant high operating costs; is difficult to maintain as the mesh-like surface of the drum is frequently clogged by debris; and is cost prohibitive to retrofit existing printing equipment.

Various attempts to overcome the disadvantages of the star wheel have included the provision of bars having paper contacting means mounted thereon and arranged transverse to the circulating chains of the chain delivery U.S. Pat. No. 2,025,481 of Stussi entitled "Sheet Delivery Device For Cylinder Printing Presses" represents such a system. The shortcomings of the system disclosed in this patent are discussed extensively in the above-referenced parent to this continuation-in-part application. That apparatus overcomes significant disadvantages of the prior art as typified by the Stussi patent by providing a paper guiding mechanism for attachment to a chain delivery which employs a pair of opposed clips, each of which is detachably mounted to preselected links of the circulating chains of the chain delivery (avoiding any need for the addition of a protrusion on the link or to the pintle as taught by Stussi). The clips support the bar which is thereby arranged transverse to the continuous chains of the chain delivery. At least one paper contacting member is provided having an eccentric shape and including a single bearing surface at a defined apex. The paper contacting member cooperates generally with the bar, allowing it to be held at a predetermined, adjustable position. By adjusting the orientation of the apex, the point of contact of the printed matter emergent from the impression and blanket cylinders can be preferentially varied.

While the invention described and claimed in the parent application overcomes significant problems, the applicant has found that, in operation, the clip disclosed therein, including an upper flange 30, integrally formed with the top portion 28 of the clip in combination with a lower flange 38, impose significant compressive forces transverse to the vertical (inner) side members of the links of the chains to which are attached. Such compressive forces may restrict the mobility of the chains, resulting in the retention of crimps which result from the passage of the chain over the sprockets of the chain delivery mechanism. Such undesired distortion of the shape of the chain may, in fact, cause it to go off track. Additionally, while the particular eccentric shape of the paper contacting elements of the invention disclosed in the parent application has proven advantageous, the Applicant has found that the existence of a large variety of printing mechanisms results in a need for greater adjustability of the point of contact with the printed material.

SUMMARY OF THE INVENTION

These and other shortcomings of the prior art are solved by the present invention wherein there is provided improved apparatus for preventing smuding of a sheet as it is guided onto a chain delivery mechanism. Generally, such apparatus is of the type which includes a bar having a pair of clips at opposed ends for engaging the continuous chains of the chain delivery and at least one paper contacting member mounted and longitudinally adjustable upon the bar. The improvement is effected through the inclusion of means for applying a substantially vertical compressive retaining force to the side members of pre-selected links of the chains.

This and additional advantages and features of the present invention will best be understood in conjunction with the set of drawings which accompanies this specification. In the drawings and in the specification, like numerals refer to like features throughout.

BRIEF DESCRIPTION OF THE DRAWINGS

FIG. 2 is an enlarged cross-sectional view showing the apparatus according to the present invention taken along the line 2—2 of FIG. 1;

FIG. 3 is a cross-section view of the improved clip mechanism of the present invention taken along the line 3—3 of FIG. 2; and FIG. 4 is an enlarged view of a paper contacting member according to the present invention taken along the line 4—4 of FIG. 1.

DETAILED DESCRIPTION

Figure 1:
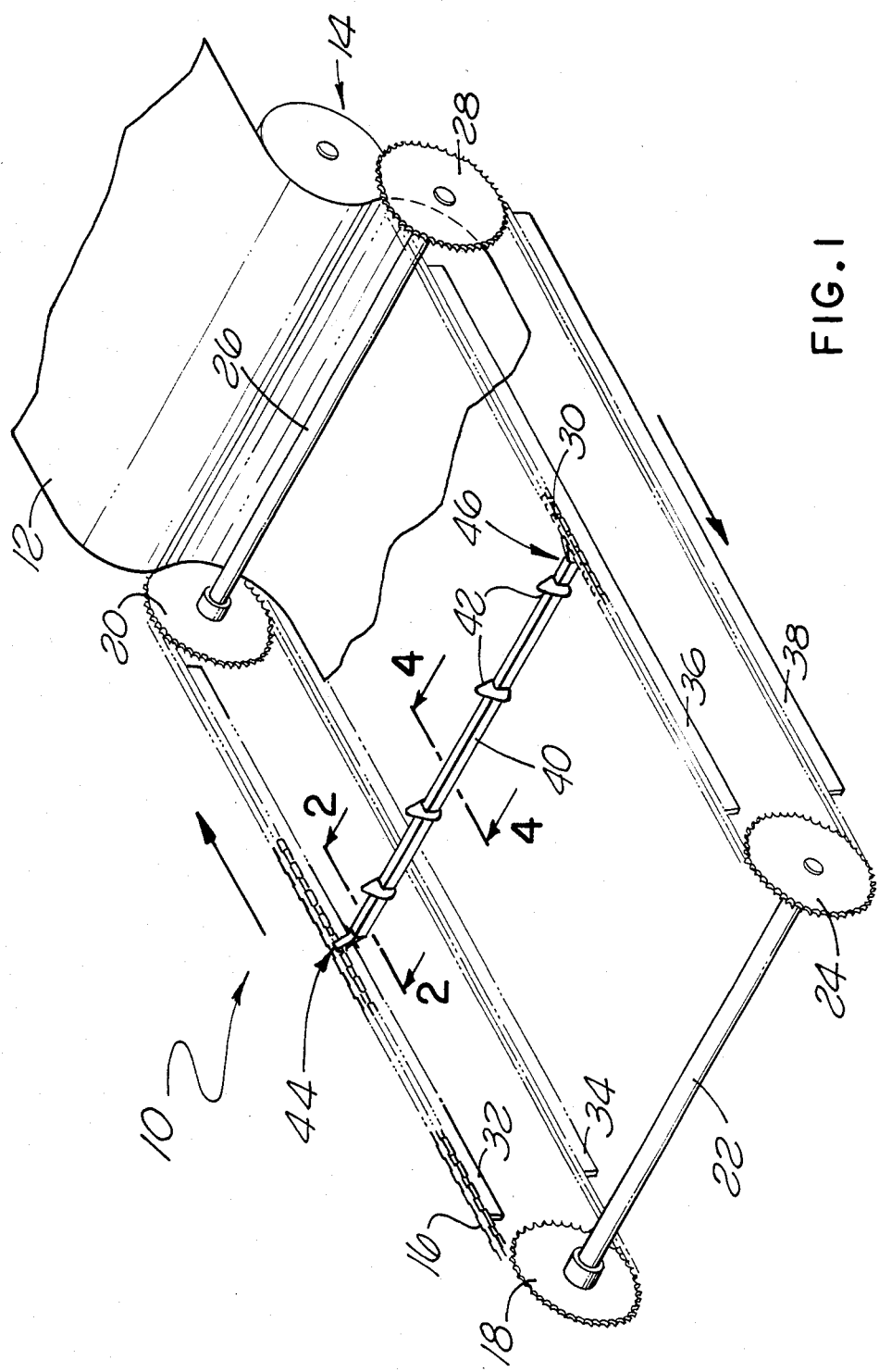
FIG. 1 is a perspective view of a chain delivery mechanism incorporating apparatus according to the present invention.

Turning now to the drawings, a chain delivery mechanism incorporating the present invention is shown in FIG. 1. The chain delivery 10 is located within an offset printing system for accepting a sheet of printed material 12 as it emerges from a rotating impression cylinder 14.

The chain delivery 10 is characterized by a pair of opposed circulating chains 16 and 30 that advance conventional gripper mechanisms (not shown) which grasp and, after a preselected amount of travel, release the printed material which thereafter accumulates into a pile beneath the chain delivery 10 . The first chain 16 circulates between a drive wheel 20 and a sprocket 18. The drive wheel 20, engageable with a suitable drive mechanism and linkage (not shown), rotates about a drive axle 26, the opposed end of which is coupled to a drive wheel 28. An axle 26 is secured at one end to the sprocket 18 and, at the opposed end, to a sprocket 24. The chain 30 circulates between the drive wheel 28 and the sprocket 24 in like manner to that in which the chain 16 circulates between the drive wheel 20 and the sprocket 18. Rails 32, 34, 36 and 38 provide support for the chains 16 and 30 throughout the lengths of chain between the sprockets.

A bar 40, having a plurality of paper contacting members 42 positioned thereon, is secured to the rotating chains 16 and 30 at its opposed ends by means of clips 44 and 46. The bar 40 circulates with the chains 16 and 30 about the the chain delivery 10. As it passes over the sprockets 20 and 28, the paper contacting members 42 make contact with and support the sheet 12 emerging from the impression cylinder 14. Although only a single bar 40 is shown in FIG. 1, it will be appreciated that a plurality of such mechanisms is preferably clipped to the opposed chains 16 and 30 to prevent smudging as the sheet 12 enters the chain delivery 10.

A significant feature of the present invention that will become apparent in the description to follow arises from the unique geometry of the paper contacting members 42. As will be seen, each member 42 includes four separate bearing surfaces that allow adjustment of the apparatus to accommodate the variety of spacings between the impression cylinder 14 and the chain delivery 10 that can be found in different offset printing systems. Thus, the apparatus of the invention is readily adaptable to numerous in-place systems.

FIG. 2 is an enlarged view, partially in cross-section, of a clip for the bar 40 taken along the line 2—2 of FIG. 1. From this view, it can be seen that the clip includes an attachment portion 48 that is insertable within the bar 40. A flap 50 is formed at the rear of the attachment portion of the clip for backing or retaining a spring 52. The clip is seen to be attached to the (inner) vertical side of a link of one of the chains of the chain delivery. The side of the link comprises generally circular portions 54 and 56 joined at a narrowing or neck 55. Pintles or shafts 58 and 60 secure an identical (outer) side to form the completed link. Additionally, the pintles 58 and 60 provide pivotal movement between the link and adjacent links.

FIG. 3 is a cross-sectional view of a clip according to the present invention taken along the line 3—3 of FIG. 2. The clip is seen to include an inclined portion 62 formed integrally with the attachment portion 48. A flange 64 extends from the topmost segment of the inclined portion 62. A downturned lip 66 is formed at the end of the flange 64.

Applicant's invention includes a unique mechanism for attachment to the vertical (inner) sides of preselected links of the chains of the chain delivery which in the illustrated embodiment is desired to prevent interference with the rails 32, 34, 36 and 38. By means of such mechanism, undesired transverse compression forces between sides of adjacent links are avoided. A jaw 68, having a flange 70 that is approximately parallel to the flange 64, is moveable within the outer body of the clip. Pins 72 and 74, secured to the jaw 68, are moveable within slots 76 and 78 provided in the sides of the inclined section 62 of the outer body of the clip. The jaw 68 is actuated to a link-grasping condition by the spring 52. The pin 74 abuts the spring 52, which thereby exerts a leftward-acting force upon the jaw 68 as shown in FIG. 3. The slot 76, comprised of two sections having angularly disposed axes, acts in conjunction with the pin 72 to redirect the spring force upwardly, the pin 72 and slot 76 functioning somewhat in the manner of a cam and follower arrangement. The pin 72, being fixed to the jaw 68, a corresponding upward-acting force is applied thereto and to the flange 70. Thus, the spring 52 is seen to provide force that is translated, by the geometry employed into the upward movement of the flange 70 of the jaw 68 toward the nearly-parallel upper flange 64.

In the figure, it is seen that the vertical (inner) sides 81 and 82, which are rotatably secured by the pintle 60, are retained by the compressive action of the flanges 64 and 70 and the lip 66 therewith. The resultant force upon the sides 81 and 82 of the adjacent links is directed almost entirely in the vertical plane as the cam of the slot 76, in combination with the geometry of the jaw 68, have been selected to assure that the resultant force acting upon the sides 81 and 82 of the adjacent links acts substantially in the vertical plane at the point of contact therewith. Thus, transverse forces between the sides 81 and 82 of the adjacent links are minimized and the degradation of the performance of the chain delivery that can result from the loss of interlink mobility is minimized.

FIG. 4 is a view, partially in cross-section taken along the line 4—4 of FIG. 3, that illustrates the unique and advantageous shape of a paper contacting member 42 and its manner of attachment or interaction with the bar 40. The member 42 is of appropriate elastomeric composition. As is seen, four bearing surfaces 92, 94, 96 and 98 are formed about its periphery. The member 42 includes a circular opening 84, the diameter of which is chosen such that the member 42 fits snugly about the perimeter of the bar 40 while being rotatably adjustable to a plurality of fixed positions. Axes 84, 86, 87 and 88, which connect the center of the circular opening 84 to the bearing surfaces, are of unequal lengths. Thus, by rotating the member 42 about the bar 40, three-hundred and sixty degrees of freedom are available for positioning a given bearing surface so that, upon passing over the sprockets 20 and 28 as shown in FIG. 1, the point of contact between the paper 12 and the chain delivery is adjusted in accordance with the spacing of the impression cylinder 14 from the chain delivery 10 utilized in the particular type of offset printing system to which the invention has been adapted.

Thus, it is seen that there has been brought to the printing arts new and improved apparatus for facilitating the removal of sheet-like printed materials from associated printing apparatus and its entry into a chain delivery mechanism. By incorporating apparatus according to the invention into otherwise conventional offset printing apparatus, one may realize the advantages inherent in a system which uses removable clips to secure a bar, including paper contacting members, to the opposed chains of the chain delivery without facing the undesirable complications arising such as link immobility. Further, the invention disclosed herein is adaptable to a variety of in-place printing systems by the usage of a unique and advantageous paper contacting member geometry.

While an embodiment of the invention has been described in detail, it will be obvious to those skilled in the art that the invention may be embodied otherwise without departing from its spirit and scope.

What is claimed:

1. In apparatus for preventing the smudging of a sheet as it is guided onto a chain delivery mechanism, said apparatus being generally of the type including a bar having a pair of clips at opposed ends for engaging the continuous chains of the chain delivery and at least one paper contacting member mounted and longitudinally adjustable upon said bar, the improvement comprising said clips including:
   (a) an outer body member, said member including a first flange;
   (b) a jaw member insertable within said outer body member, said jaw member including a second flange;
   (c) said outer body members and said jaw members being arranged so that said first and second flanges are substantially parallel; and
   (d) means for urging said flanges together for applying a substantially vertical compressive retaining force to the side members of pre-selected links of said chains.

2. Apparatus as defined in claim 1 wherein said first flange includes a lip member.

3. Apparatus as defined in claim 2 wherein said means for urging said substantially parallel flanges together includes a spring.

4. Apparatus as defined in claim 3 wherein said means for urging said flanges together further comprises;
   (a) at least one pin fixed to said jaw;
   (b) said outer body member including at least one slot; and
   (c) said at least one pin is movable within said at least one slot.

5. Apparatus as defined in claim 4 wherein one slot includes substantially longitudinal portions having angularly disposed principal axes.

6. Apparatus as defined in claim 5 wherein said outer body member further includes:
   (a) an attachment portion for coupling to said bar; and
   (b) an inclined portion integral therewith.

7. Apparatus as defined in claim 1 or claim 6 wherein said at least one paper contacting member has an eccentric shape including a plurality of bearing surfaces.

8. Apparatus as defined in claim 7 wherein said bearing surfaces are disposed unequal distances from the center of said member.

9. Apparatus as defined in claim 8 wherein said at least one paper contacting member is rotatable about said bar to achieve a pre-selected positioning of said bearing surfaces.

10. Apparatus as defined in claim 9 wherein said at least one paper contacting member has four bearing surfaces.

11. Apparatus as defined in claim 10 including four paper contacting members.

* * * * *